US006478583B1

(12) United States Patent
Standiford et al.

(10) Patent No.: US 6,478,583 B1
(45) Date of Patent: Nov. 12, 2002

(54) TIME MONITORING PORTABLE GAME SYSTEM

(76) Inventors: Jocelyn D. Standiford, 5304 Charles St., Racine, WI (US) 53402; Candius L. Edgerle, 4019 North La., Franksville, WI (US) 53126

( * ) Notice: Subject to any disclaimer, the term of this patent is extended or adjusted under 35 U.S.C. 154(b) by 0 days.

(21) Appl. No.: 09/500,594

(22) Filed: Feb. 10, 2000

Related U.S. Application Data

(63) Continuation-in-part of application No. 09/267,008, filed on Mar. 11, 1999, now Pat. No. 6,039,574.

(51) Int. Cl.[7] ............................................. G09B 19/12
(52) U.S. Cl. ............................. 434/304; 368/3; 368/45
(58) Field of Search .......................... 463/14; 434/304; 368/3, 45, 82, 108

(56) References Cited

U.S. PATENT DOCUMENTS

| | | | |
|---|---|---|---|
| 2,274,811 A | | 3/1942 | Sisson |
| 3,230,383 A | | 1/1966 | MacArthur |
| 3,735,500 A | | 5/1973 | Matsumoto |
| 4,345,145 A | | 8/1982 | Norwood |
| 4,354,260 A | * | 10/1982 | Planzo ........................ 368/10 |
| 4,395,134 A | * | 7/1983 | Luce .............................. 368/3 |
| 4,424,967 A | * | 1/1984 | Yokoi et al. .................... 273/1 |
| 4,618,927 A | | 10/1986 | Hatta |
| 5,044,961 A | | 9/1991 | Bruskewitz |
| 5,150,899 A | | 9/1992 | Kitaue |
| 5,326,104 A | * | 7/1994 | Pease et al. ............. 273/138 A |
| 5,455,808 A | * | 10/1995 | Grupp et al. .................. 368/82 |
| 5,570,325 A | * | 10/1996 | Arpadi ........................ 368/10 |
| 5,596,544 A | | 1/1997 | Hagadorn |
| 5,684,758 A | * | 11/1997 | Gray et al. ................... 364/10 |
| D387,383 S | | 12/1997 | Chan |
| 5,736,720 A | | 4/1998 | Bell et al. |

* cited by examiner

Primary Examiner—Michael O'Neill
Assistant Examiner—Julie Brocketti
(74) Attorney, Agent, or Firm—Jansson, Shupe & Munger, Ltd.

(57) ABSTRACT

A child educational entertainment device is provided including a housing with a display mounted thereon. Further included is a control mechanism positioned within the housing and adapted to be prompt a user to enter an amount of time. Once the time has been entered, a decrementing timer is displayed to count down from the entered amount of time. The control mechanism has at least one mode wherein it is adapted to graphically display the decrementing timer. Further, additional modes are included for entertainment purposes.

18 Claims, 5 Drawing Sheets

TIME MONITORING PORTABLE GAME SYSTEM

RELATED APPLICATION

This application is a continuation-in-part of Ser. No. 09/267,008, filing date of Mar. 11, 1999, entitled "TIME MONITORING PORTABLE GAME SYSTEM" now U.S. Pat. No. 6,039,574.

FIELD OF THE INVENTION

The present invention relates to electronic games and more particularly pertains to a new time monitoring portable game system for entertaining a child within a vehicle and further affording a better appreciation of a duration of a trip.

DESCRIPTION OF THE PRIOR ART

The use of electronic games is known in the prior art. More specifically, electronic games heretofore devised and utilized are known to consist basically of familiar, expected and obvious structural configurations, notwithstanding the myriad designs encompassed by the crowded prior art which have been developed for the fulfillment of countless objectives and requirements.

Known prior art electronic games includes U.S. Pat. Nos. 4,618,927; 2,274,811; 3,230,383; 3,735,500; . 5,044,961; U.S. Pat. Des. No. 387,383 which are each incorporated hereby by reference.

The time monitoring portable game system according to the present invention substantially departs from the conventional concepts and designs of the prior art, and in so doing provides an apparatus primarily developed for the purpose of entertaining a child within a vehicle and further affording a better appreciation of the duration of a trip.

SUMMARY OF THE PRESENT INVENTION

In view of the disadvantages inherent in the known types of electronic games now present in the prior art, the present invention provides a new time monitoring portable game system construction which entertains a child within a vehicle and further affords a better appreciation of a duration of a trip.

The general purpose of the present invention, which will be described subsequently in greater detail, is to provide a new time monitoring portable game system apparatus and method which has many of the advantages of the electronic games mentioned heretofore and many novel features that result in a new time monitoring portable game system which is not known in the prior art electronic games.

To attain this purpose, the present invention generally comprises a housing having a planar rectangular front face, a planar rectangular rear face and a thin periphery formed therebetween. Such periphery is defined by a short top edge, a short bottom edge and a pair of elongated side edges. The rear face has a battery compartment formed therein with a removable cover for allowing selective access to batteries stored therein. One of the side edges has a port formed therein adjacent to the bottom edge for releasably receiving a first end of an adapter. As shown in FIG. 2, the second end of the adapter has a vehicular cigarette lighter plug mounted thereon for being connected to a cigarette lighter port of a vehicle for receiving power therefrom.

As shown in FIG. 1, a square liquid crystal primary display is mounted on the front face of the housing and spaced from the top edge and the bottom edge thereof. The liquid crystal primary display has a light for illuminating the same upon the actuation thereof. Associated therewith is a light emitting diode digital display mounted on the front face of the housing adjacent to the top edge thereof. For reasons that will soon become apparent, the digital display is adapted for displaying numerals representative of a clock.

FIG. 1 shows an actuation toggle switch mounted on the front face of the housing for actuating the device upon the depression thereof. Also mounted on the front face of the housing is a light actuator button that is positioned between the light emitting diode digital display and the liquid crystal primary display. The light actuator button is adapted for actuating the light of the liquid crystal primary display upon the depression thereof. Next provided is a pause button mounted on the front face of the housing. Further buttons include a clear button and a select button mounted on the front face of the housing. Positioned between the liquid crystal primary display and the bottom edge of the housing is a plurality of direction buttons mounted on the front face of the housing. Finally, an enter button is mounted on the front face of the housing and positioned between the direction buttons. Also included is a control means positioned within the housing and connected between the displays, switch, and buttons.

In use, the control means, upon the actuation of the device, is adapted to prompt a user to enter an amount of time. This is accomplished via the direction buttons with the subsequent depression of the enter button. Once the enter button has been depressed, a decrementing time is displayed on the digital display which counts down from the entered amount of time. At any time during use, the control means may be reset upon the simultaneous depression of the clear button and the enter button. When reset, the control means again prompts the user to enter the amount of time by the aforementioned method. It should be noted that the control means has a plurality of modes of operation, each of which employs the display in a unique manner. During operation, the control means serves to switch between each of the modes of operation by the depression of the select button.

A first mode of operation will now be set forth. During such mode, the control means is adapted to display a matrix on the primary display with a number of columns and rows to define a plurality of spaces. The number of columns is equal to a number of hours included with the entered amount of time. Each column is representative of one of the hours. The spaces of each of the four rows are each representative of a quarter of an hour. In the preferred embodiment, the spaces of each column have a common unique color associated therewith. During operation in the first mode, the spaces of each column are illuminated with the associated color upon the cessation of each quarter of an hour increment, as indicated by the decrementing timer depicted on the digital display. As an option, the decrementing timer may be paused upon the depression of the pause button and further restarted upon the subsequent depression of the pause button.

The remaining modes of operation of the control means share many common characteristics. Similar to while in the first mode, the control means in the remaining modes displays a matrix on the primary display with a number of columns and rows defining a plurality of spaces, each with an object therein. At any time during operation, the control means allows one of the spaces to be selected via the direction buttons. Once selected, the space may be cleared from the primary display upon the depression of the enter button. The control means transmits a sound signal to the speaker when the enter button is depressed.

The remaining modes are distinguished from one another by the object contained within each of the spaces. For example, in a second mode, a plurality of alphabetic letters are positioned in the spaces, as shown in FIG. 3D. Further, in a third mode, either a color or a shape is positioned in each of the spaces, as shown in FIG. 3C. FIG. 3B shows each of the spaces including a graphic representation of an object commonly seen along side of a road. Finally, in a fourth mode, the spaces each include a graphic representation of a person carrying out an errand. This fourth mode does not have a reference drawing as FIGS. 3A–D.

In accordance with a still further aspect of the present invention, an educational device is provided. The educational device includes a timer for tracking time during a user selected time period. As is conventional, the time period has a plurality of intervals. A display device having a screen is provided for displaying an image thereon. This image has a plurality of components. Each component has a first illuminated state and a second non-illuminated state. A controller is operatively connected to the timer and to the display device. The controller changes the state of one component in response to completion of a corresponding interval of the time period.

It is contemplated that the educational device includes a second timer for tracking the user selected time period. The second timer includes a display providing a visual representation of the time period during tracking. The educational device may also include a pause selection device operatively connected to the timer for pausing the timer.

The display device may include a second screen for displaying an image thereon. The image on the second screen has a plurality of components. Each component has a first illuminated state and a second non-illuminated state. A toggle mechanism is provided for toggling between the first and second screens. A control pad allows for a user to select one of the components of the image on the second screen. The controller changes the state of the selected component. As described, the image displayed on the second screen is a game and a user interface allows the user to play the game displayed on the second screen.

In accordance with a still further aspect of the present invention, an educational device is provided. The education device includes a timer for tracking time during a user selected time period. The time period has a plurality of intervals. The display device includes first and second screens. Each screen displays an image formed from a plurality of components. Each component has a first illuminated state and a second non-illuminated state. A toggle switch is provided for toggling the display between the first and second screens. A controller is operatively connected to the timer and to the display device. The controller changes the state of one component of the first screen in response to the completion of a corresponding interval of the time period.

A pause selection device may be operatively connected to the timer for pausing the timer. It is contemplated to arrange the plurality of components of the first screen in rows and columns. Similarly, it is contemplated to arrange the plurality of components of the second screen in rows and columns. A user interface allows the user to select one of the components in the second screen. The controller changes the state of the component selected. The user interface includes a cursor for traveling on the second screen and a control pad for moving the cursor on the second screen to a user decided location corresponding to one of the components and for allowing a user to select the same.

In accordance with a still further aspect of the present invention, an educational device is provided. The educational device includes a timer for tracking time during a user selected time period. The time period has a plurality of intervals. A first display screen displays an image formed from a plurality of components. Each component corresponds to one of the intervals and has a first illuminated state and a second non-illuminated state. A second display screen also displays an image from a plurality of components. Each component in the second display screen corresponds to an object to be located by a user and has a first illuminated state and a second non-illuminated state. A toggle switch allows the user to toggle between the first and second display screens. A controller is operatively connected to the timer and to the display screens. The controller changes the state of one component of the first display screen in response to completion of a corresponding interval of the time period. A user interface allows the user to select one component of the second display screen. The controller changes the state of the one component selected.

It is contemplated that the education device further include a second timer for tracking the user selected time period. The second timer includes a display providing a visual representation of the time period during tracking. The user interface may include a cursor for traveling on the second screen and a control pad for moving the cursor on a second screen to a user desired location corresponding to one of the components. The control pad allows a user to select one of the components at the user desired location. It is contemplated to arrange the plurality of components of the first and second display screens in rows and columns.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended thereto.

Before explaining the embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is an object of the present invention to provide a new time monitoring portable game system apparatus and method which has many of the advantages of the electronic games in the art and many novel features that result in a new time monitoring portable game system which is not disclosed by the prior art electronic games, either alone or in any combination thereof.

It is another object of the present invention to provide a new time monitoring portable game system which may be easily and efficiently manufactured and marketed.

It is a further object of the present invention to provide a new time monitoring portable game system which is of a durable and reliable construction.

An even further object of the present invention is to provide a new time monitoring portable game system which is susceptible of a low cost of manufacture with regard to both materials and labor, and which accordingly is then susceptible of low prices of sale to the consuming public, thereby making such time monitoring portable game system economically available to the buying public.

Still yet another object of the present invention is to provide a new time monitoring portable game system which provides in the apparatuses and methods of the prior art some of the advantages thereof, while simultaneously overcoming some of the disadvantages normally associated therewith.

Still another object of the present invention is to provide a new time monitoring portable game system for entertaining a child within a vehicle and further affording a better appreciation of a duration of a trip.

Even still another object of the present invention is to provide a new time monitoring portable game system that includes a housing with a display mounted thereon. Further included is a control mechanism positioned within the housing and adapted to prompt a user to enter an amount of time. Once the time has been entered, a decrementing timer is displayed to count down from the entered amount of time. The control mechanism has at least one mode wherein it is adapted to graphically display the decrementing timer. Further, additional modes are included for entertainment purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than these set forth above will become apparent when consideration is given to the following detailed description thereof. Such description makes reference to the annexed drawings wherein.

DESCRIPTION OF THE PREFERRED EMBODIMENT

Figure 1:
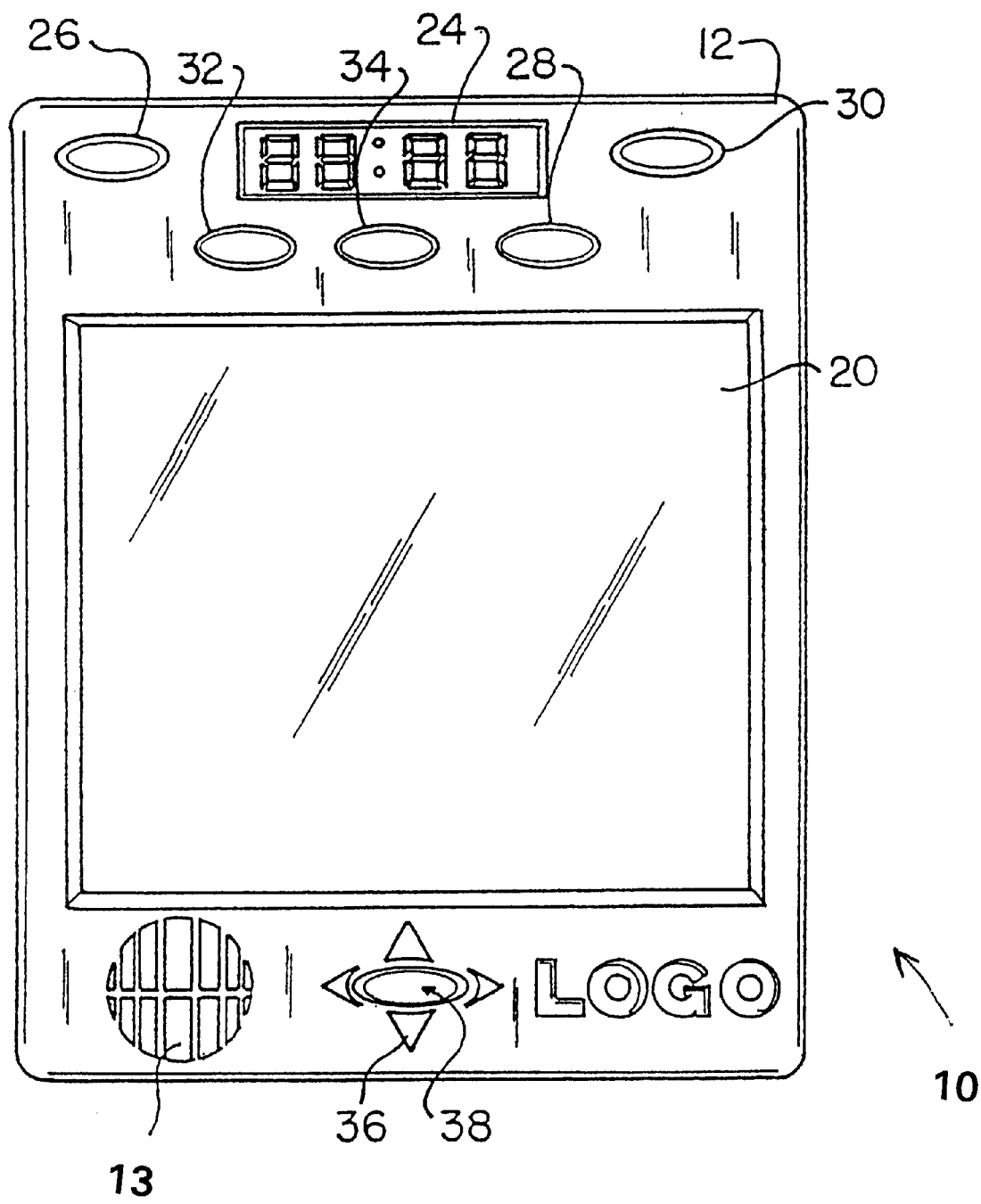
FIG. 1 is a front view of a new time monitoring portable game system according to the present invention.
Figure 2:
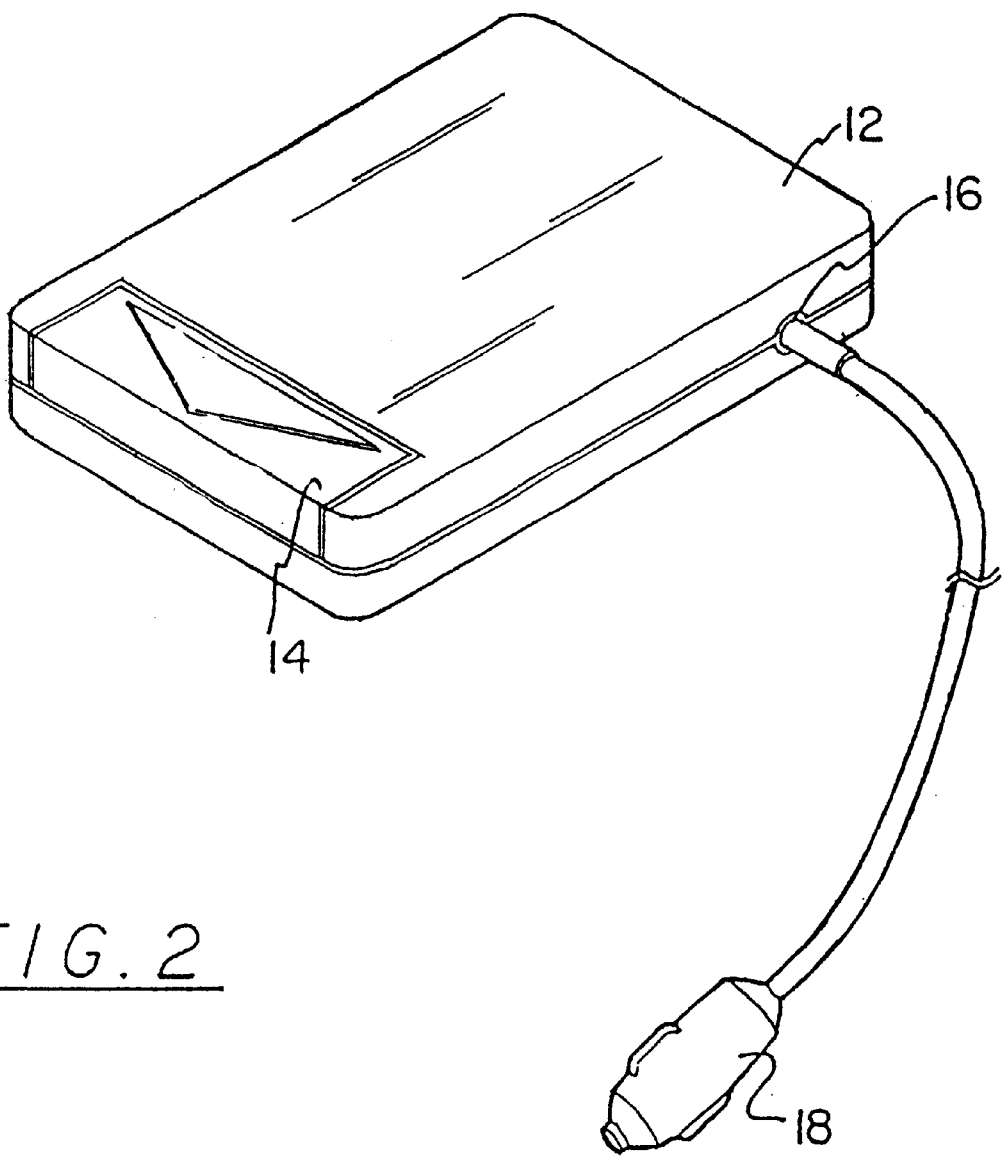
FIG. 2 is a rear perspective view of the present invention.
Figure 3A:
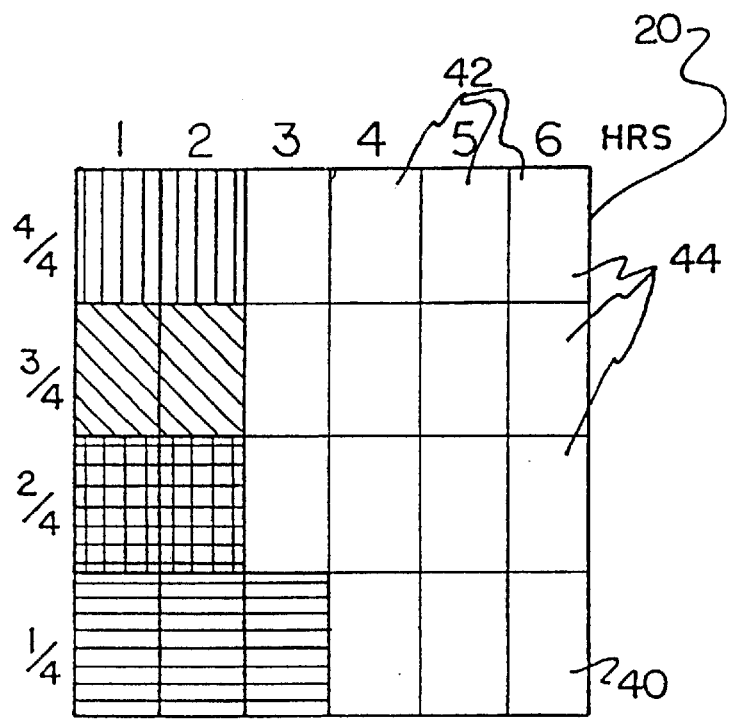
FIGS. 3A–D are front views of the display while the control means is in the various modes of operation.

With reference now to the drawings, and in particular to FIGS. 1 through 3 thereof, a new time monitoring portable game system embodying the principles and concepts of the present invention and generally designated by the reference numeral 10 will be described.

The present invention, designated as numeral 10, includes a housing 12 having a planar rectangular front face, a planar rectangular rear face and a thin periphery formed therebetween. Such periphery is defined by a short top edge, a short bottom edge and a pair of elongated side edges. The rear face has a battery compartment 14 formed therein with a removable cover for allowing selective access to batteries stored therein. One of the side edges has a port 16 formed therein adjacent to the bottom edge for releasably receiving a first end of an adapter. As shown in FIG. 2, the second end of the adapter has a vehicular cigarette lighter plug 18 mounted thereon for being connected to a cigarette lighter port of a vehicle to receive power therefrom. Ideally, the port is further equipped to receive a 12V power adapter for use with conventional alternating current receptacles. Further, it is preferred that the cord be at least 5 feet in length, or sufficient to reach into a rear seat of a vehicle.

As shown in FIG. 1, a square liquid crystal primary display 20 is mounted on the front face of the housing and spaced from the top edge and the bottom edge thereof. The liquid crystal primary display has a light for illuminating the same upon the actuation thereof. Associated therewith is a light emitting diode digital display 24 mounted on the front face of the housing adjacent to the top edge thereof. For reasons that will soon become apparent, the digital display is adapted for displaying numerals representative of a clock.

FIG. 1 shows an actuation toggle switch 26 mounted on the front face of the housing for actuating the device upon the depression thereof. Also mounted on the front face of the housing is a light actuator button 28 that is positioned between the light emitting diode digital display and the liquid crystal primary display. The light actuator button is adapted for actuating the light of the liquid crystal primary display upon the depression thereof.

Next provided is a pause button 30 mounted on the front face of the housing. The pause button is preferably positioned on a side of the digital display opposite the actuation toggle switch, as shown in FIG. 1. Further buttons include a clear button 32 mounted on the front face of the housing and positioned between the liquid crystal primary display and the top edge of the housing. Associated therewith is a select button 34 mounted on the front face of the housing and positioned between the liquid crystal primary display and the top edge of the housing.

Positioned between the liquid crystal primary display and the bottom edge of the housing is a plurality of arrow-shaped direction buttons 36 mounted on the front face of the housing. Finally, an enter button 38 is mounted on the front face of the housing and positioned between the direction buttons.

Also included is an unillustrated control means positioned within the housing and connected between the displays, switch, and buttons. It should be noted that the control means may include a microcontroller connected to the aforementioned components and configured to carry out the functions to be set forth herein. In the alternative, a CPU may be employed with programming code adapted to carry out the functions set forth herein.

In use, the control means, upon the actuation of the device, is adapted to prompt a user to enter an amount of time. This is accomplished via the direction buttons with the subsequent depression of the enter button. Specifically, the left and right direction buttons which represent hours and minutes, respectively, may be depressed while the up and down direction buttons may be used to increase and decrease the amount of time to be entered. Once the enter button has been depressed, a decrementing timer is displayed on the digital display which counts down from the entered amount of time. At any time during use, the control means may be reset upon the simultaneous depression of the clear button and the enter button. When reset, the control means again prompts the user to enter the amount of time by the aforementioned method.

It should be noted that the control means has a plurality of modes of operation each of which employs the display in a unique manner. During operation, the control means serves to switch between each of the modes of operation by the depression of the select button. It should be noted that a user may operate the device in each of the modes simultaneously by simply switching between them. In each of the modes, the decrementing timer continues to be displayed on the digital display during operation and switching between each of the modes.

A first mode of operation will now be set forth. During such mode, the control means is adapted to display a matrix 40 on the primary display with a number of columns 42 and rows 44 to define a plurality of spaces. The number of columns is equal to a number of hours included with the entered amount of time. Each column is representative of one of the hours. The spaces of each of the four rows are each representative of a quarter of an hour. In the preferred embodiment, the spaces of each column have a common unique color associated therewith. Ideally, such colors include blue, yellow, green, and red from bottom to top.

During operation in the first mode, the spaces of each column are illuminated with the associated color upon the cessation of each quarter of an hour increment, as indicated by the decrementing timer depicted on the digital display. In other words, the pixels of the space which is normally blank change to the appropriate color. By this operation, a child is afforded a better appreciation of how long a trip is scheduled to take. As an option, the decrementing timer may be paused upon the depression of the pause button and further restarted upon the subsequent depression of the pause button. This accommodates for when the vehicle has been stopped and is no longer moving.

The remaining modes of operation of the control means share many common characteristics. Similar to while in the first mode, the control means in the remaining modes displays a matrix on the primary display with a number of columns and rows to define a plurality of spaces, each with an object therein. At any time during operation, the control means allows one of the spaces to be selected via the direction buttons. Once selected, the space has a unique color and the object therein may be cleared from the primary display upon the depression of the enter button. It should be noted that when the object is removed from the space, a portion of a background picture is displayed. As such, upon each of the spaces being cleared, the background picture is seen in whole and a congratulations is sounded by a speaker 13. Such background picture preferably includes a clock face. It should be noted that the control means transmits a sound signal to the speaker 13 when the enter button is depressed to further provide positive reinforcement.

Figure 3B:
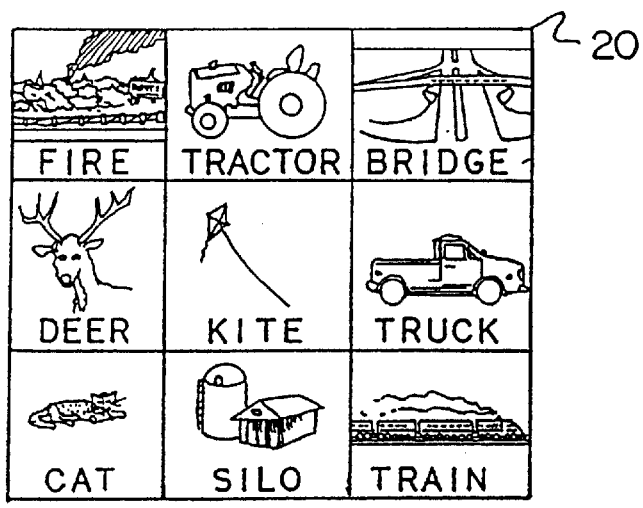
Figures 3C, 3D:
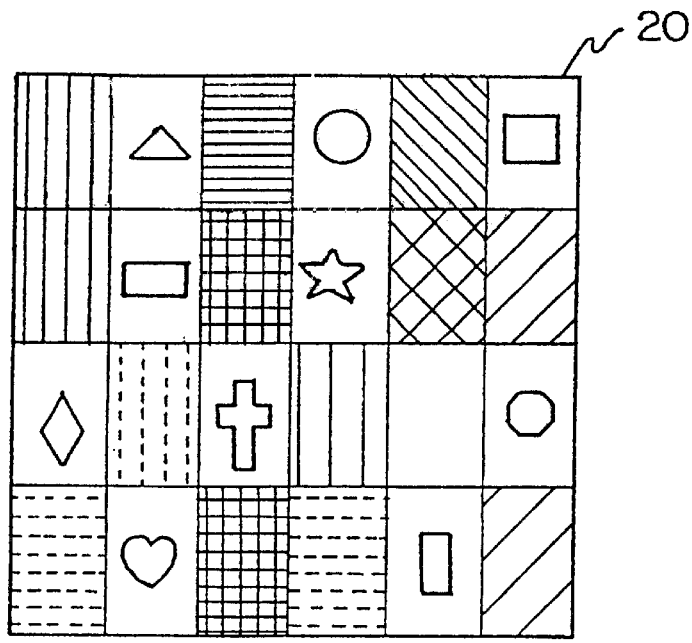

The remaining modes are distinguished from one another by the object within each of the spaces. For example, in a second mode, a plurality of alphabetic letters are positioned in the spaces, as shown in FIG. 3D. Further, in a third mode, either a color or a shape is positioned in each of the spaces, as shown in FIG. 3C. FIG. 3B shows each of the spaces including a graphic representation of an object commonly seen along side of a road. Finally, in a fourth mode, the spaces each include a graphic representation of a person carrying out an errand. Due to the similarity with the third mode, the fourth mode has not been shown in the Figures. As an option, additional modes may be included which are similar to the foregoing modes with the exception of the level of play. For example, advanced modes may be included for encouraging players to find more obscure or interacting objects.

In order to use the present invention, a player may pick a mode and find surrounding objects which match the objects within the spaces. For example, in the second mode, a player would search for objects which start with a letter listed within the space. In the third mode, a player would attempt to find objects which have similar colors or shapes. Finally, in the remaining modes, the player would search for specific objects and await certain errands to be carried out as indicated by the graphic representations within the spaces. At any time, a player may employ the first mode to use the graphic representation of time to gain a better appreciation of a duration of a trip within a vehicle.

Hand-held electronic timer/educational devices help children develop a realistic concept of time when traveling or anxiously awaiting an activity, give kids a colorful visual representation of time remaining, make travel less stressful for everyone and prevent kids from asking, "How much longer?"

The shell of device can be produced from injection-molded plastic and preferably measures 5" wide by 6½" long, and 1" thick. The battery-operated device can also be powered via vehicle cigarette lighter adapter or standard 110-volt plug (DC adapter). The cords are preferably approximately 5 feet long. The front of the device preferably features a 4½" by 4½" LCD screen, above which is preferably positioned (from left to right) an "on/off" toggle switch, an LCD countdown timer, and a "pause" button. Below the LCD timer are preferably (from left to right) a "clear" button, "select" button, and a "light" activation button for night use. Four arrow buttons (up, right, down, and left) surrounding an "enter" button are preferably positioned below the LCD screen to allow movement of an on-screen cursor. A speaker is preferably located on the lower left of the device and the logo, "How Much Longer?", in the lower right of the device. All of the noted buttons push in, except for the "on/off" which slides back and forth with effort for less chance of the device accidentally getting turned off.

In the "clockface" mode the LCD screen will display the whimsical "Mr. Clockface" character and his voice will say, "How Much Longer?" when the on/off button is turned on.

In the "timer" mode the "select" button is pushed and the LCD screen will be blank until a parent/child programs in the length of waiting time. Up to approximately 18 hours or possibly up to 24 hours can be programmed, depending on the device's graphical sizing. By using the arrow buttons, the LCD count down timer will be set for the amount of hours and minutes of waiting time. By pressing the "enter" button, the LCD screen will display a grid or chart, with columns corresponding to the amount of waiting time as programmed into the device. Each column represents 1 hour and is divided into four 15-minute increments of time. At first, the graph appears with a light blue colored background with black column lines. Each hour gradually fills in with a primary color (the columns are in the order of red, orange, yellow, green, blue, purple, and the colors repeat as needed according to the number of hours programmed in) to give children a larger visual display and representation of passing time.

For example, for a 5½ hour trip the "on/off" toggle switch is turned on (Mr. Clockface mode), then the "select" button is pressed (the "timer" mode), then the left arrow button (representing hours) is held down and the upper arrow button is pushed to accelerate up to the 5 hours (the down arrow can be used to correct the amount of hours), then the left arrow button is released. The minutes are set by holding down the right arrow button and pushing the upper arrow button to accelerate up to 30 minutes, then releasing the right arrow button. The "enter" button is then pressed and the LCD screen displays a grid of five and one-half columns which have been divided into the appropriate number of 15-minute increments.

When the trip begins, the "enter" button is pressed again, and the LCD countdown timer starts decreasing and at the same time the grid would gradually start filling up with color. If the situation arises that the trip must be interrupted (for gas, rest stop, or motel), the "pause" button is pushed to temporarily stop the function of the Countdown Timer and Grid. (if the trip is interrupted for an extended period, for example, overnight, the device can be plugged into an electrical outlet using the optional 110-volt plug, so as not to wear down the batteries.)

When the trip is resumed, the "pause" button is pressed again, and the function starts up once more. At 5½ hours, the grid will have 5 columns full of colors and ½ of a sixth column with color, and the whimsical voice of Mr. Clockface says, "Time's Up". (If the trip is at night the "light" button may be pressed so that both LCD screens will light up.) If for any reason the countdown function needs to be permanently stopped during its operation, the "clear" button is held down and then the "enter" button is pressed, and then both are released.

While the countdown process is happening, the user has the capability of playing educational activities by pressing the "select" button so that the activity screen will come into view. The user presses "select" once to enter the "ABC" mode, twice for "Find or Think" mode, three times for "Search" mode, four times for "Advanced Search" mode, five times for "Errands" mode, and six times to go back to the "timer" mode, which has continued it's function while other modes were viewed.) The user is able to switch back and forth from an activity, back to the "timer" mode, without interrupting the play of that activity, by just pressing the "select" button. The two ways the activity will end is by the completion of the game, or by holding down the "clear" button and then pressing the "enter" button, and then releasing both.

In the "ABC" mode the LCD screen shows a grid broken into squares, six across and five down, making thirty squares. Each square has a capitalized letter, going from left to right, in alphabetical order. The last row only has the letters Y and Z, with four extra spaces. Each column is colored in the order of red, orange, yellow, green, blue, and purple (as in the "timer" mode). A cursor is in view in the upper left hand square. Using the "arrow" buttons the user is able to move the cursor. The user can play the game two ways. The user has to find an object on the road that starts with a chosen letter (ex. A for apple tree), or the user can actually find that alphabet letter on objects the user sees along the roadside (e.g., S for the letter in the word STOP, in a stop sign), while traveling or any place the user is waiting for a countdown of time (e.g., C for the letter in chair in the living room or T for the letter in train at the train station). (The user may choose to play the game in alphabetical order or random order.) When the user finds that letter, using the "arrow" buttons, the user moves the cursor to that letter, then presses the "enter" button, which removes that letter square, a beep sounds, and part of "Mr. Clockface" appears in that spot. Once all letters have been found and removed, the whole "Mr. Clockface" will appear and his voice will say, "Good Job". (The four extra spaces noted above reveal the appropriate portion of "Mr. Clockface", at the beginning of the game.)

In the "Find or Think" mode the LCD screen is broken into squares, five across and five down, making 25 squares. From left to right, the squares contain (color and shapes): red, triangle, blue, circle, green, square, black, cross, yellow, star, orange, diamond, white, vertical rectangle, brown, heart, pink, octagon, gray, horizontal rectangle, gold, oval, silver, pentagon, and purple. The cursor appears in the upper left hand square. The user searches for colors or shapes on the road or any place the user is waiting for the countdown of time (ex. green for grass or blue for carpet). Using the "arrow" buttons, the user is able to move the cursor. When the user finds a color or shape (in random order), using the "arrow" buttons, the user moves the cursor to that square, then presses the "enter" button, which removes that square, a beep sounds, and a part of "Mr. Clockface" appears in that spot. Once all squares have been found and removed, the whole "Mr. Clockface" will appear and his voice will say, "Good Job". (For the squares that are a color, that square is visually that color and that color is spelled out within the square in black letters. For the squares with shapes, the background is a light blue and the shape is drawn in black.).

In the "Search" mode the LCD screen shows a grid broken into squares, five across and five down, making twenty-five total squares. Each square preferably has a light blue colored background with a picture drawn in black. A cursor is in view in the upper left hand square. The twenty-five pictures comprise items children may see when traveling and watching the passing landscape such as a bird, cow, overpass, semi, barn, or church. When an object that matches one of the squares (in random order) is spotted on the roadside, the "arrow" buttons are used to move the cursor to the matching square, and pressing the "enter" button will remove that picture square, a beep sounds and a part of "Mr. Clockface" appears in that spot. Once all pictures have been found and removed, the whole "Mr. Clockface" appears and his voice says "Good Job!".

In the "Advanced Search" mode the information is the same as for the above "Search" mode except that children search for 25 objects that are more difficult to find, such as a bird on wire, a railroad crossing sign, men at work, an airplane, a fire hydrant, and a kite.

In the "Errands" mode the LCD screen shows a grid broken into squares, six across and five down, making thirty squares. Each square preferably has a light blue colored background with pictures drawn in black. The pictures represent different types of stops or errands that a parent/caretaker may have to make in a day (for example, a bag for groceries, dollar sign $ for bank, gas pump for getting gas at gas station, toothbrush and paste for dentist, stethoscope for doctor, etc.) The cursor is preferably in view in the upper left hand square. Using the "arrow" buttons, the cursor is moved to the squares which are intended to be eliminated from the LCD screen ( unless there is a total of thirty stops). To remove those unwanted errands, the "arrow" buttons are used to move the cursor, and pressing the "enter" button removes each square. (As in all modes, the beep sound will go off each time a square is removed.) The only squares left should be the errand stops, with the rest of the LCD screen revealing portions of "Mr. Clockface". As the selected errands are completed, the cursor is moved with the "arrow" buttons, and pressing the "enter" button will remove each errand, a beep will sound, and more of "Mr. Clockface" appears. When all errands are completed, the whole "Mr. Clockface" appears and his voice says "Good Job".

Noted above are instructions to temporarily stop the Countdown Timer and Grid from functioning, and to permanently stop a game. When the device is in operation, the "on/off" toggle switch must be positioned in the "on" position. Sliding the "on/off" toggle switch into the "off" position will permanently turn off the device and any memory that has been stored in countdown and activities/ games will be erased.

Figure 4:
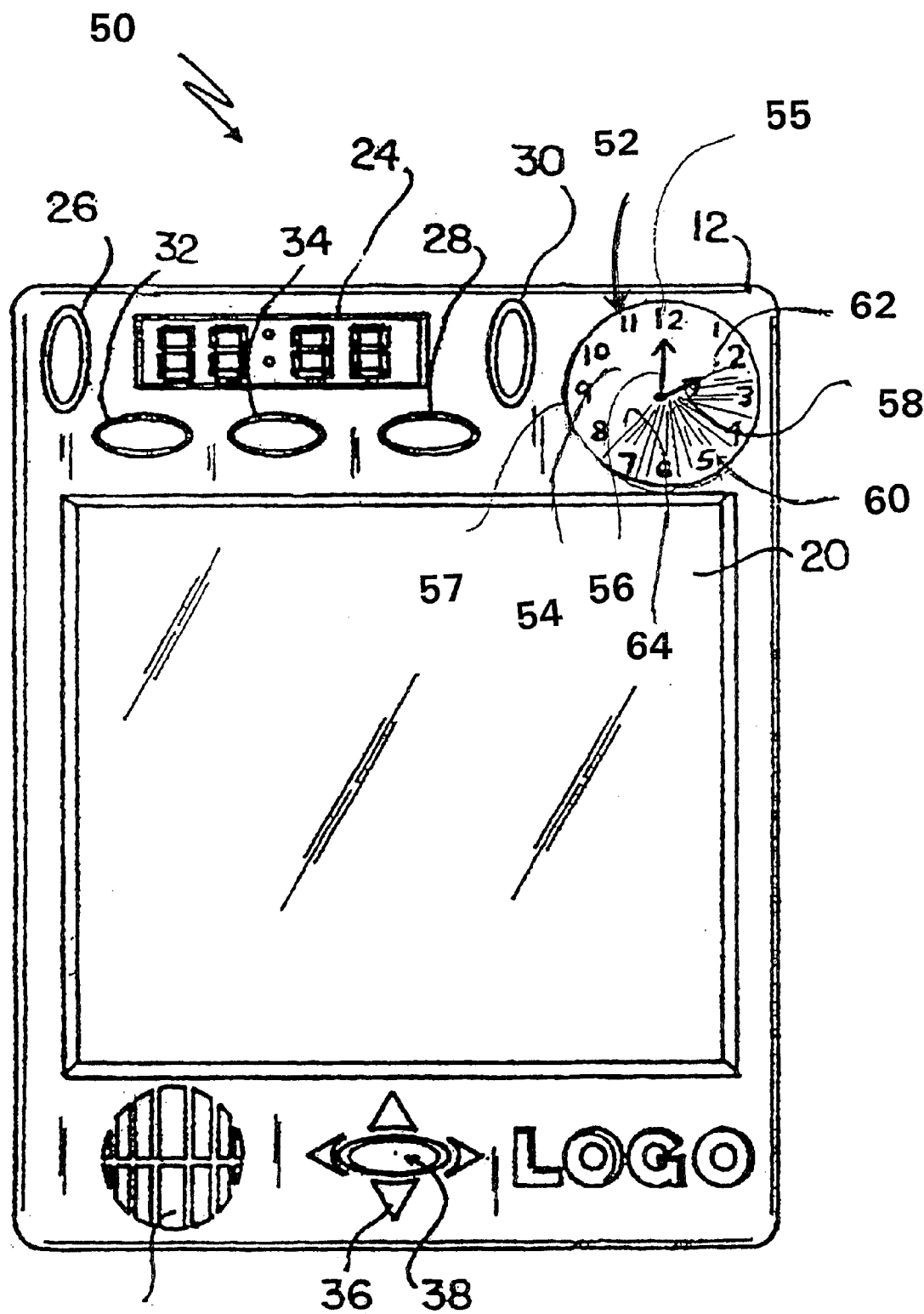
FIG. 4 is a front view of a second embodiment of a time monitoring portable game system in accordance with the present invention.

Referring to FIG. 4, an alternate embodiment of the time monitoring portable game of the system of the present invention is generally designated by the reference numeral 50. With the exception of second timer 52, time monitoring portable game system 50 is substantially identical to the time monitoring portable game system 10, and as such, the prior description of time monitoring portable game system 10 is understood to describe time monitoring game system 50 as if fully described hereinafter.

Second timer 52 of time monitoring portable game system 50 includes a conventional clockface 54 having conventional hour designations 55 about the outer periphery 57 thereof. Second timer 52 further includes a minute hand 56 and an hour hand 58. Any portion or all of clockface 54 may be illuminated, as hereinafter described.

In operation, minute hand 56 and hour hand 58 are set to correspond to the present time. After a user enters the time period, as heretofore described, a portion of the clockface generally designated by the reference numeral 60 is illuminated. The portion 60 of clockface 54 which is illuminated corresponds to the path traveled by hour hand 58 of second timer 52 during the duration of the time period entered. As the user entered time period elapses, the portion 60 of clockface 54 illuminated decreases. In other words, hour hand 58 defines the trailing edge 62 of the illuminated portion 60 of clockface 54.

In a preferred embodiment, second timer 52 will function as a conventional analog clock. As such, upon depression of the pause button 30, the leading edge 64 of illuminated portion 60 of clockface 54 will be adjusted to take into account the time period in which the time monitoring portable game system of the present invention is paused.

With respect to our invention above, we realize that there may be a need to make variations in size, material, shape, form, colors, function and manner of operation internally and externally, assembly and use, position of buttons, maximum hours programmable for countdown timer and grid, or new ideas for games or home use. In addition, there may be optional modes with different formats. There could be different/separate devices with varying levels of difficulty for age appropriateness: one geared toward toddlers, preschoolers, elementary, or more advanced ages.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various modes of carrying out the invention are contemplated as being within the scope of the following claims particularly pointing out and distinctly claiming the subject matter which is regarded as the invention.

We claim:

1. An educational device, comprising:
    a timer for tracking time during a selected time period, the time period having successive intervals;
    a display device including a first screen for displaying a first image, the first image having more than one first component, each first component representing a specific interval and having a first state and a second state;
    a controller operatively connected to the timer and to the display device, the controller changing the state of one first component in response to completion of the interval represented by the first component, thereby allowing a user who is unable to understand digital or analog clocks to discern the passage of time;
    a second screen for displaying a second image, the second image having second components and each second component having a first illuminated state and a second non-illuminated state; and
    a toggle mechanism for toggling between the first and the second screens.

2. The educational device of claim 1 further comprising a pause selection device operatively connected to the timer for pausing the timer.

3. The educational device of claim 1 further comprising a control pad for allowing the user to select one of the second components, the controller changing the state of the second component selected.

4. The educational device of claim 1 wherein the second image is a game.

5. The educational device of claim 4 further comprising a user interface to allow the user to play the game displayed on the second screen.

6. The educational device of claim 1 wherein each first component is non-illuminated in the first state and illuminated in the second state.

7. An educational device, comprising:
    a timer for tracking time during a selected time period, the time period having successive intervals;
    a display device including first and second screens, the first screen displaying a first image formed from first components, each first component corresponding to a single interval, and the second screen displaying a second image formed from second components, each first and second component having an illuminated state and a non-illuminated state;
    a toggle switch for toggling the display device between the first and the second screens; and a controller operatively connected to the timer and to the display device, the controller changing the state of one first component in response to completion of the corresponding interval, thereby allowing a user who is unable to understand digital or analog clocks to discern the passage of time.

8. The educational device of claim 7 further comprising a second timer for tracking the selected time period, the second timer including a display providing a visual representation of the time period during tracking.

9. The educational device of claim 7 further comprising a pause selection device operatively connected to the timer for pausing the timer.

10. The educational device of claim 7 further comprising a user interface for allowing a user to select a second component, the controller changing the state of the second component upon selection.

11. The educational device of claim 10 wherein the user interface includes:

a cursor for traveling on the second screen; and a control pad for moving the cursor on the second screen to the desired location corresponding to a second component and for selecting the same.

12. The educational device of claim 7 wherein the state of one first component is changed in response to completion of the corresponding interval, thereby allowing the user to discern the passage of an interval and to compare the remaining time to the completed time, the remaining time being represented by the first components in one of the illuminated or non-illuminated states, the completed time being represented by the first components in the other of the illuminated or non-illuminated states.

13. An educational device, comprising:

a timer for tracking time during a selected time period, the time period having successive intervals;

a first display screen for displaying a first image formed from first components, each first component corresponding to a specific interval and having an illuminated state, the first display screen displaying every first component in the illuminated state at one of the beginning and the end;

a second display screen for displaying a second image formed from second components, each second component corresponding to an object to be located by a user and having a primary condition and a secondary condition;

a toggle switch for toggling between the first and second display screens to be visually displayed to the user;

a controller operatively connected to the timer and to the display screens, the controller changing the state of a first component in response to completion of the corresponding interval; and a user interface for allowing a user to select a second component, the controller changing the condition of the second component upon selection.

14. The educational device of claim 13 further comprising a second timer for tracking the user selected time period, the second timer including a display providing a visual representation of the time period during tracking.

15. The educational device of claim 13 wherein the user interface includes:

a cursor for traveling on the second screen; and a control pad for moving the cursor on the second screen to a user desired location corresponding to a second component and for selecting the same.

16. The educational device of claim 13 wherein the first components are arranged in rows and columns and wherein the second components are arranged in rows and columns.

17. The educational device of claim 13 wherein the state of only one first component is changed in response to the completion of any interval.

18. The educational device of claim 13 wherein the state of each first component is changed only upon completion of the interval corresponding to the first component and wherein each first component corresponds to only one interval.

* * * * *